United States Patent

[11] 3,613,777

[72] Inventor  Jiyuichi Nara
                7-8, Hugashi-aai 2-chome, Shenagawa-ku, Tokyo, Japan
[21] Appl. No. 865,632
[22] Filed     Oct. 13, 1969
[45] Patented  Oct. 19, 1971
[32] Priority  Feb. 18, 1969
[33]           Japan
[31]           44/12064

[54] HEAT EXCHANGE APPARATUS FOR POWDERED MATERIALS
4 Claims, 13 Drawing Figs.

[52] U.S. Cl. .................................................. 165/86
[51] Int. Cl. .................................................. F28d 11/02
[50] Field of Search .......................................... 165/86, 87, 92

[56]           References Cited
               UNITED STATES PATENTS
3,020,025   2/1962   O'Mara ....................... 165/87
3,285,330  11/1966   Root ........................... 165/86

Primary Examiner—Frederick L. Matteson
Assistant Examiner—Theophil W. Streule
Attorney—George B. Oujevolk ABSTRACT: A heat exchange apparatus for powdered materials characterized by a plurality of wedge-shaped hollow revolving bodies mounted in a rotating shaft circumferentially of the shaft, a heat exchange medium being passed from said shaft into said hollow revolving bodies, powdered materials being moved in an axial direction, said powdered materials being heated or cooled by said revolving bodies.

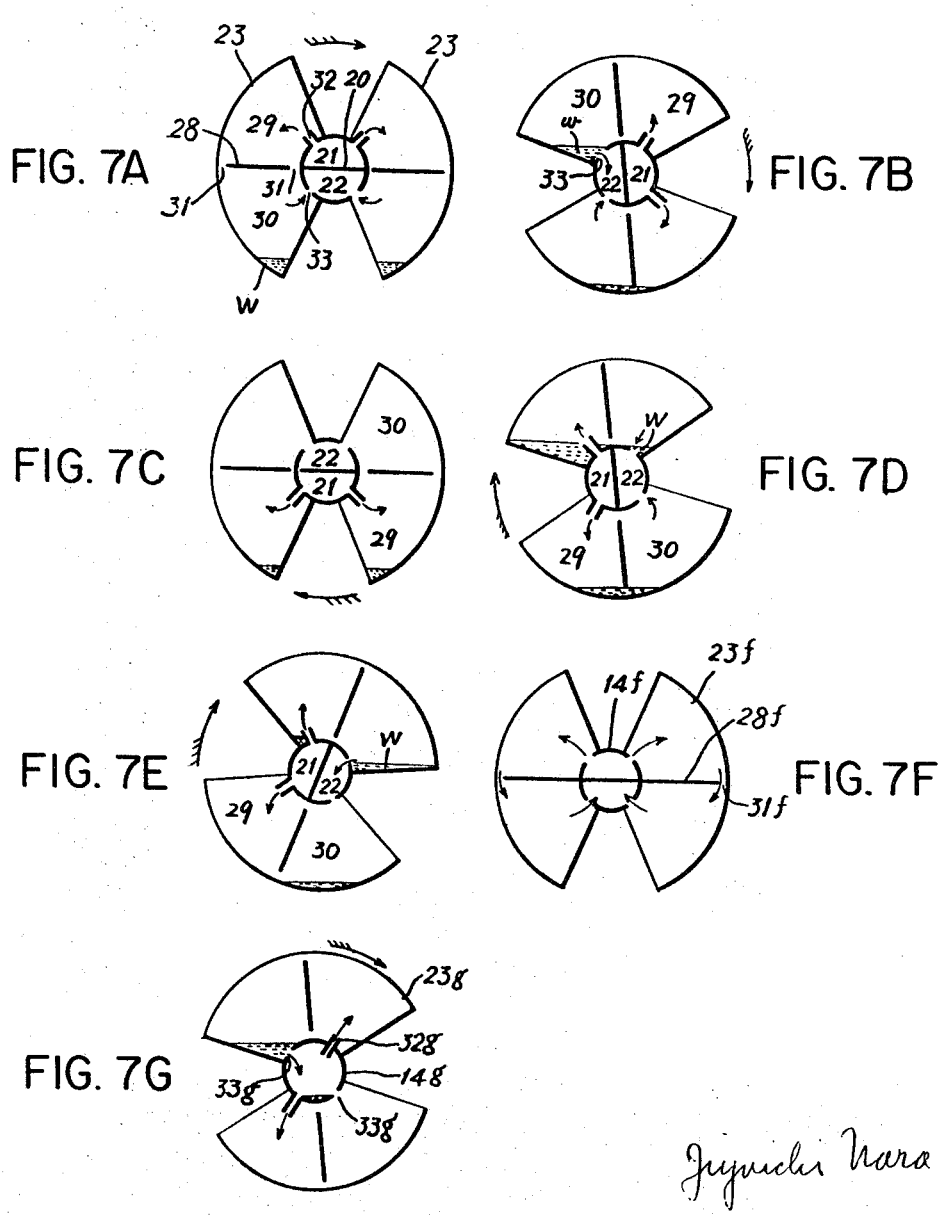

HEAT EXCHANGE APPARATUS FOR POWDERED MATERIALS

BACKGROUND OF THE INVENTION

This invention relates to an apparatus for heating pr cooling powdered materials by bringing the same into contact with heat exchangers that are hallow and mounted on the circumference of a shaft so as to pass the heat exchange medium through the hollow heat exchangers and to impart rotation thereto.

The heat exchanges of this type that have hereto fore been used are operated under the following two systems. One is a screw conveyor system consisting of a shaft with a hollow, broad, helically wound blade, with a heat exchanged medium passing through said hollow portion and powdered materials being moved in the direction of the rotating shaft, thereby effecting heat exchange of the powdered materials. The other is a thermal disc system comprising a plurality of hollow discs mounted on a shaft with a plurality of said shafts disposed in parallel so that each shaft may be rotated in the same direction while a heat exchange medium is being passed through hollow portion of each disc and powdered materials may be moved in the direction at right angles with rotating shaft thereby effecting heat exchange.

The apparatuses of the type described above have the following drawbacks as a heat exchange apparatus.

The screw conveyor system is small in its area of heat exchange per unit volume of a casing because of the structure in which it comprises a helically wound continuous blade. And this restriction on the heating area of a heat exchanger constitutes a fatal disadvantage to an apparatus whose object is to effect heat exchange. Stated differently, such restriction means that operational efficiency is low. The thermal disc system, because the discs that constitute heat exchangers are rotated in the same direction as powdered materials move, is not only inferior in coefficient of heat transfer (Kcal./m.$^2$Hn°C.) on the heating surface of the heat exchangers but also the fine powder in the pulverulent bodies sticks to the disc surfaces, coats the same with the fine powder, and the fine powder that sticks to the discs reduces heat conductivity, with a resultant reduction in coefficient of heat transfer. And what is worse, it makes the coating of the fine powder thicker in layer that the direction of rotation of the discs is parallel to the direction of movement of the powdered materials. Such a tendency is noticed also in the case of the aforestated screw conveyor system, for example, the layer of powdered materials becomes very coarse on the side opposite to the thrust moving planes of their blades, namely in the neighborhood of the back sides of the blades, thus forming causes for reduction in coefficient of heat transfer and for sticking of fine powder.

SUMMARY OF THE INVENTION

This invention has for its object an improvement in coefficient of heat transfer by removing the drawbacks of each system described above in such a manner that heat exchangers are automatically purged of the fine powder which sticks thereto not by direct application of a flow of heat exchange gas to powdered materials but by rotating heat exchangers of particular shape, thus a greater part of heating area of the heat exchangers being brought into continued effective action of heat transfer and the powdered materials being efficiently stirred.

That is to say, the heat exchange apparatus for powdered materials provided by the invention is characterized in that a plurality of wedge-shaped bodies of revolution are mounted on a rotating shaft in the circumferential direction of the shaft, a heat exchange medium is delivered from the shaft into the hollow portions of the revolving bodies, powdered materials are moved in an axial direction, and said powdered materials are heated up or cooled down by said revolving bodies.

The present invention will be described with reference to the accompanying drawings showing an embodiment of the invention.

BRIEF DESCRIPTION OF THE DRAWINGS

FIGS. 7A through 7E are imaginary sectional views illustrating the working of the revolving body and FIGS. 7F through 7G are sections likewise illustrating the working of another embodiment.

DESCRIPTION OF THE PREFERRED EMBODIMENT

Figure 1:
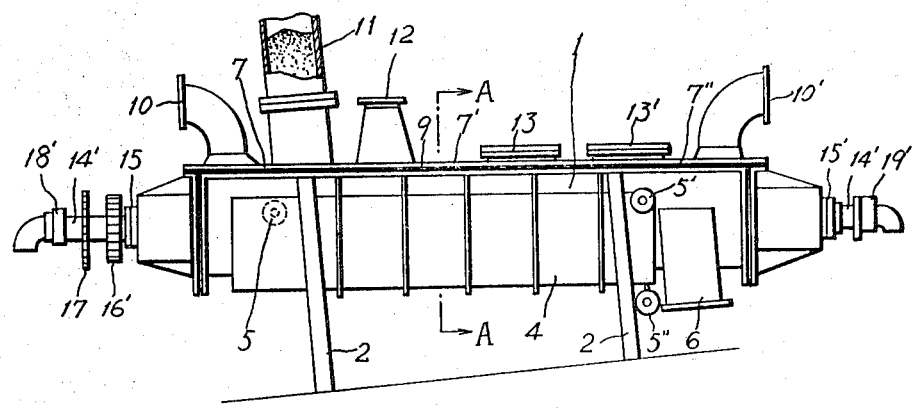
FIG. 1 is a side view of the heat exchange apparatus according to this invention.
Figure 2:
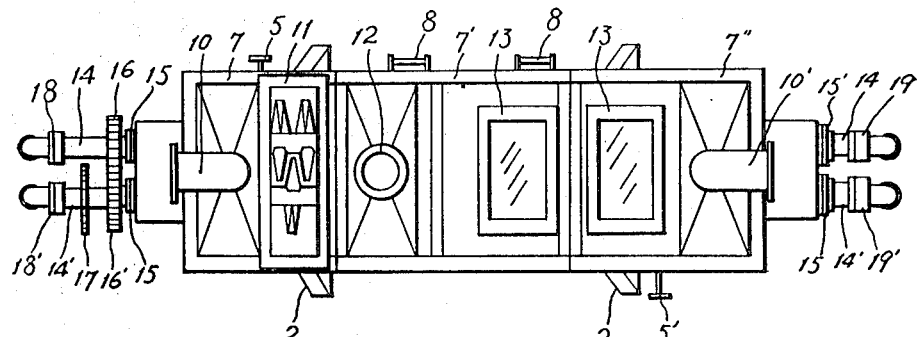
FIG. 2 is a plan view of the heat exchange apparatus of FIG. 1.
Figure 3:
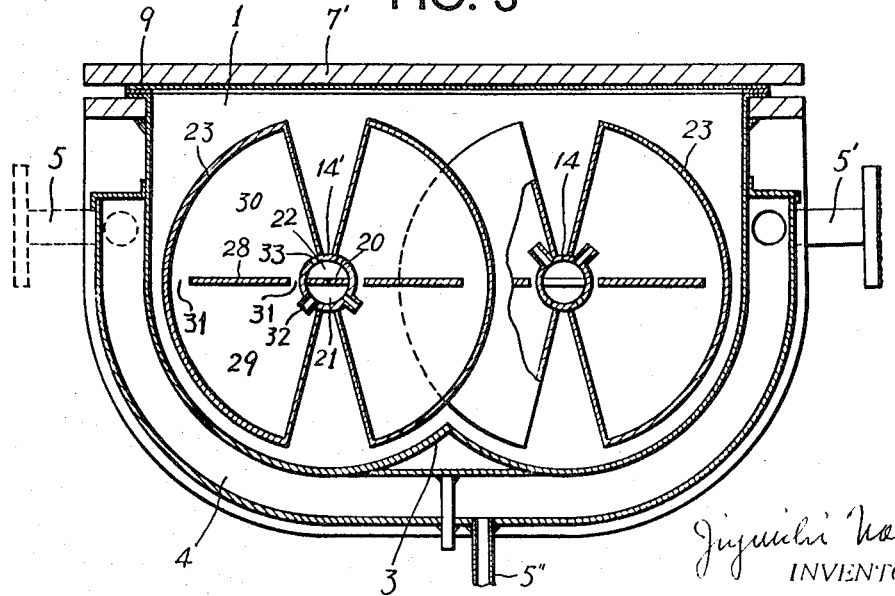
FIG. 3 is an enlarged sectional view taken along the line A—A of FIG. 1.

Embodiment of this invention will be described with reference to the apparatus shown in the drawing. The casing 1 is a container relatively long sideways, and supported slightly aslant by supporters 2. The casing 1 is of bowl-shaped section described by two arcs, and a protuberance 3 formed by said arcs extends in a projected streak longitudinally at the bottom of the middle of the container. And a jacket 4 for heat exchange extends over the substantially entire surface of the bottom. The numerals 5, 5', and 5" designate coupling mouthpieces for pipe for heat exchange medium formed in the jacket. Also at the bottom of the rear portion of the casing is provided an outlet 6 and on the upper side of the casing are placed covers 7, 7' and 7", and the cover 7' is hinged by shafts 8 to the casing. Each cover hermetically closes the casing through a packing 9. Each cover is provided between the front and rear portions of the casing with a carrier gas inlet 10, a material inlet 11, a carrier gas outlet 12, peep windows 13 and 13', and a carrier gas inlet 10'. Two hollow shafts 14 and 14' pass in parallel through the front and rear portions of the casing, and are rotatably carried on the bearings 15 and 15' provided on the front and rear portions of the casing. Said each shaft is fitted on the front portion thereof with gears 16 and 16' adapted to be in mesh with each other and reversely rotatable, and the shaft 14' is operatingly connected to a motor through an endless chain (not shown) which is trained over a sprocket wheel 17 provided on the shaft 14'. Said each shaft is fitted at the front end thereof with pressure rotating joints 18 and 18', which are connected to a heat exchange medium pipe (not shown). The rear portion of each shaft includes in the same manner as the front portion thereof pressure rotating joints 19 and 19', by which the rear portion is connected to a heat exchange medium pipe (not shown). (See FIGS. 1 through 3).

Each shaft 14, 14' is provided inside thereof with a separator 20 longitudinally partitioning the inside of the shaft into a primary chamber 21 and a secondary chamber 22. The primary chamber 21 is connected to the front portion of the shaft and the secondary chamber 22 is connected to the rear portion. This structure is not particularly shown, but this can be carried out by hermetically closing the front end of the secondary chamber on the front portion of the hollow shaft and the front end of the primary chamber on the rear portion thereof by use of semiarcuate end plates.

Figure 4:
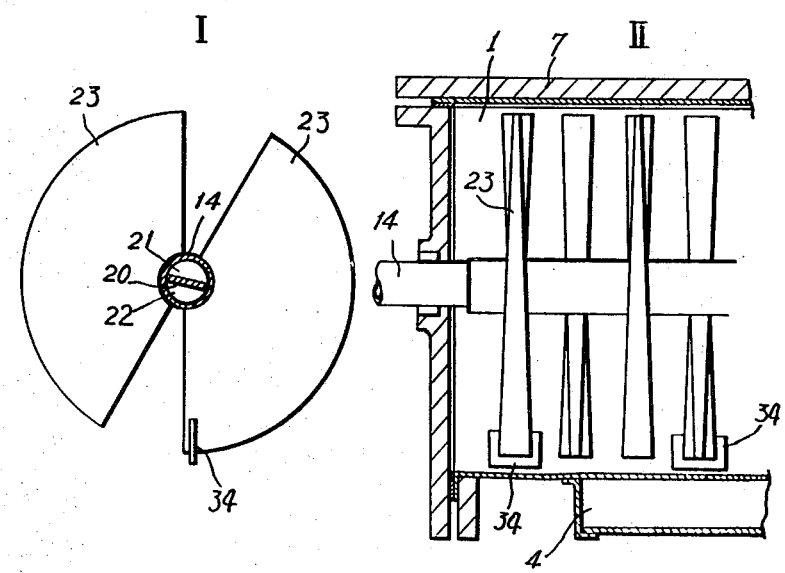
FIG. 4 is another embodiment of a wedge-shaped hollow revolving body with front and side views thereof shown respectively in FIGS. 1 and 2, in which FIG. 2 particularly shows revolving bodies enclosed win a casing.
Figure 5:
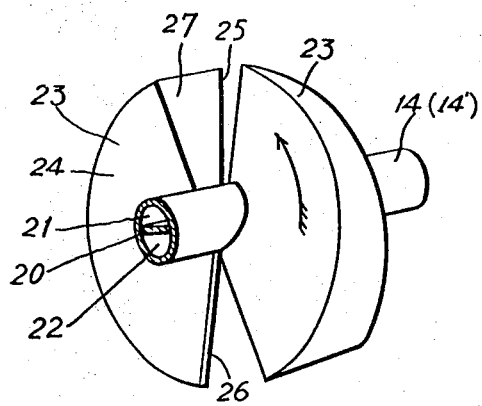
FIG. 5 is a perspective view of the revolving body.
Figure 6:
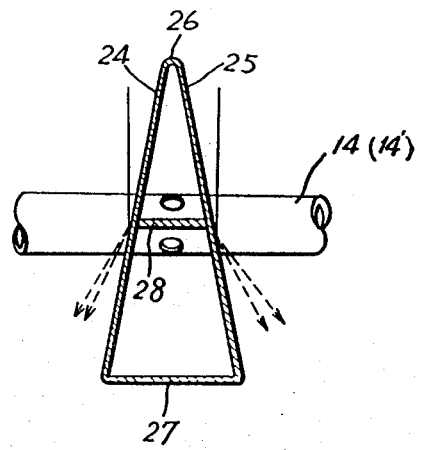
FIG. 6 is a side view, broken in part, of the revolving body, illustrating how fine powder adhered to the revolving body is dropped.

Each shaft is provided at regular spaces with a plurality of heat exchangers. These heat exchangers are wedge-shaped hollow revolving bodies 23 as shown in FIG. 5, and the front side 24 and rear side 25 of each of said revolving bodies are respectively formed into segments, each of which is brought into the shape of a wedge in such a manner that the front and rear sides of a pair of segments cross each other in their inclined planes, and a front end 26 forwardly of the line of intersection of each of said inclined planes terminates in a line and the rear end 27 terminates in a plane, and a front end 26 is adapted to push powdered materials aside and rotate in the direction of an arrow. Two revolving bodies are disposed in a symmetrical position with a certain space left therebetween. Inside the revolving body is disposed a separator 28 by which is partitioned into a primary chamber 29 and a secondary chamber 30, said separator 28 being formed with suitable holes 31, said primary chamber of the revolving body 29 communicating with the primary chamber 21 of the shaft through a communication pipe 32 formed so as to protrude in the shaft, said secondary chamber 30 of the revolving body communicating with the secondary chamber 22 of the shaft through a communication hole 33 formed in the shaft. The revolving body mounted on two shafts are positioned in an alternately staggered relation to each other (FIGS. 4 to 6).

A description will be made of heating of powdered materials by the use of this apparatus. (The same is the case with cooling). First, the powdered materials, either in powdered or granulated form, are fed into a casing 1 through a material inlet 11 continuously in specified quantities. A heating medium of a specified temperature, such as, for example, steam or hot water is circulated through a jacket 4, to heat the casing to a specified temperature. Two shafts 14 and 14' are quietly rotated by a motor through a sprocket 17, to feed a heating medium, such as, for example, steam or hot water from rotating joints 18 and 18' to each shaft. The heating medium passes from the primary chamber 21 of the shaft through the primary chamber 29 and the secondary chamber 30 of the heat exchanger, the secondary chamber 22 of the shaft, and is then discharged through the rotary joint of the rear portion of shaft 19'. FIGS. 7A through 7E show how the revolving body is rotated when steam is used as a heating medium, said body being rotated in the direction of an arrow. The steam that entered from the primary chamber 21 of the shaft enters the revolving body 23 through the communication holes 32, and after having finished heat exchange, it turns into water of condensation and stays at the bottom of the revolving body (FIG. A). Next, when the revolving body rotates through about 90°, drops of water of the revolving body passes to the secondary chamber 22 of the shaft through the communication holes 33 (FIG. B). Further, when the revolving body is rotated through about 90°, the condensed water that entered into the secondary chamber 22 enters the primary chamber 21 through the holes 32 (FIG. C), and still further through 90°, the water enters through the hole 33 into the secondary chamber 22, and then is discharged through the rotating joints 19 (FIGS. D and E). Accordingly, the water of condensation after the end of heat exchange is automatically discharged by turning into the revolving body.

FIGS. F and G shows embodiments of the invention, in which the revolving bodies are slightly different in their internal structures from each other. In FIG. F, liquid is used as the heating medium, and particularly no communication is protrudedly formed on a shaft 14f and a communication hole of a separator 28f is also formed only at one point, so that a circulating liquid may uniformly pass through a revolving body 28f. In the example shown in FIG. G steam is used as the heating medium, and this type is used when water of condensation is small in quantity, and a shaft 14g is formed with no separator, and communication tubes 32g are formed inside the shaft in a somewhat protruded manner. By so doing, even when the revolving body 23g is rotated and takes its lower position, the steam enters the revolving body through the communication tubes, and when the body takes its upper position, water of condensation enters the shaft through communication holes 33g and is discharged through the bottom of the shaft.

The powdered materials are heated by the heat exchangers and jacket, and at the same time the vapor produced from the material is discharged by a carrier gas. Air, an inert gas or the like for example, is used as the carrier gas. The carrier gas introduced under pressure through gas inlets 10 and 10' passes over the upper layer of the material in the casing and entrains at that time the vapor produced from the powdered materials and is discharged through a gas outlet 12. When the gas produced from the powdered materials is solvent vapor, the gas outlet 12 is connected to a solvent condenser by which the solvent is collected. The gas that passed through the condenser again enters the casing through the gas inlets 10 and 10' and is used for circulation.

When the powdered materials enter the casing through the inlets, they acquire fluidity by mechanical stirring, and the pressure produced by the height of filling of the powdered materials at the inlet and the inclination of the casing help the powdered materials flow down gradually through the casing, thus the powdered materials finding their way through the gaps of the revolving bodies and moving to an outlet 6.

At that time, the powdered materials are pushed aside by the revolving bodies turning at right angles with the direction in which the powdered materials advance, and when they are thus pushed aside, the powdered materials are compressed with each other, and the powdered materials thus compressed begin to expand in the space between two revolving bodies and are fully stirred, and thus heated through complete heat exchange. As both surfaces of each revolving body are inclined planes, the revolving body obtains component of force to purge the revolving body of fine powder tending to stick to the body as shown by arrows in FIG. 6. This action takes place over the entire surface of a wedge-shaped plane, and hence the fine powder is not attached to the entire surface of the heat exchangers but heated under a continued effective action of heat transfer. The powdered materials heated are discharged through the outlet 6.

Besides the embodiments shown above, if an increase in the drying degree of material is necessary, the apparatus of the invention may be used in a modified form by connecting ting a plurality of the apparatus in series and, further by increasing the number of shafts and disposing the shafts in parallel in response to efficiency of operation.

When it is desired to increase the stirring action of the wedge-shaped revolving body, mixing efficiency can be increased by fitting the revolving body 23 in its suitable position with a blade 34.

The apparatus of the invention can be used in drying of a material relatively small in quantity of vaporation, for example in finished drying of powdered materials that finished predrying (polyethylene, PVC, acrylate resin powder, etc.), or in drying of synthetic resin chips small in initial water content (polyester, nylon, etc.), and furthermore in heat drying and in cooling of a material that finished reaction (various organic and inorganic substances). Accordingly, unlike the convention heat exchanger of a screw conveyor type in which the heating surface of the back side of a screw exerts little or not action, the heat exchanger of the invention, because of the entire surface of the exchanger forming an effective heating area, is greater in operational efficiency per volume. Moreover, fine powder sticks to the back sides of screws in the case of a screw-conveyor-type heat exchanger and to the entire surface of a rotary disc in the case of a rotary-disc-type heat exchanger, and this sticking of fine powder prevents the transfer of heat and thus reduces coefficient of heat transfer, but the apparatus of the invention is of the construction in which the heat exchangers are wedge-shaped, push aside powdered materials and work on the prevention of the same from sticking to the heat exchangers by utilizing the incline planes of the wedge-shaped portions, thus keeping the heating surface free from sticking of fine powder, assuring ever-unchanging coefficient of heat transfer, and hence higher efficiency than the prior art apparatuses. When powdered materials are pushed aside by the wedge-shaped revolving bodies, they are compressed, and the powdered materials thus compressed are expanded in the space between the revolving bodies, and therefore, they are sufficiently stirred, keeping the apparatus higher in coefficient of heat transfer than those heretofore in use.

I claim for patent:

1. A heat exchanger apparatus for powdered materials, comprising in combination:

a. a hollow elongated horizontal casing;
b. a pair of hollow shafts longitudinally disposed in parallel across said casing with rotary means to rotate both shafts simultaneously, a longitudinal separator (20) in each shaft partitioning the inside of the shaft into primary and secondary chambers (21, 22);
c. a plurality of interrotating, staggered, paired, hollow, wedge-shaped rows of elements, the elements in one row overlapping those in the other row, each of said paired elements forming part of a cylinder with the corresponding paired element mounted on said shaft at right angles thereto with one of said shafts as the axis, said elements being opposite each other on the same shaft, the outer circumference of the two elements in one pair forming less than a complete circle, said outer circumference being of triangular wedge shape, the apex of one triangle facing the base of the opposite triangle, with a partition (28) in each element forming primary and secondary sections (29, 30) with apertures therein;
d. apertures and communication tubes for introducing a heat exchange fluid which will pass through said shafts and through said primary and secondary chambers, said wedge-shaped elements primary and secondary sections and a discharge aperture where said fluid will be finally discharged by the rotation of said wedge-shaped elements; and,
e. a hopper (11) for introducing a powder to said casing and powder discharge outlet (6) for discharging the treated powder.

2. An apparatus as claimed in claim 1, with said casing having an inner wall bowl-shaped in section with a heat exchange jacket, the outer circumference of said wedge-shaped elements being so sized and disposed as to rotate close to said wall.

3. An apparatus as claimed in claim 2, wherein said wall includes a longitudinal central protuberance (3).

4. An apparatus as claimed in claim 3, wherein one of said chambers (21, 22) communicates with one of the sections (29, 30) through a communications pipe protruding from said shaft.